:::page-title
United States Patent [19]

Lu
:::

[11] 3,897,393

[45] July 29, 1975

[54] POLYIMIDES FROM BISMALEIMIDES AND HETEROCYCLIC DISECONDARY DIAMINES

[75] Inventor: Robert T. Lu, Wilmington, Del.

[73] Assignee: ICI United States Inc., Wilmington, Del.

[22] Filed: Nov. 29, 1973

[21] Appl. No.: 419,994

[52] U.S. Cl....... 260/47 UA; 260/30.2; 260/32.6 N; 260/328 N; 260/33.4 P; 260/47 CZ; 260/78 UA
[51] Int. Cl............................................ C08g 20/32
[58] Field of Search....... 260/47 CZ, 47 UA, 78 UA

[56] References Cited
UNITED STATES PATENTS

| | | | |
|---|---|---|---|
| 3,625,912 | 12/1971 | Vincent et al. | 260/30.2 |
| 3,637,901 | 1/1972 | Bargain et al. | 260/830 |
| 3,652,511 | 3/1972 | Vincent et al. | 260/78 |
| 3,658,764 | 4/1972 | Bargain et al. | 260/78 |
| 3,669,930 | 6/1972 | Asahara et al. | 260/47 |
| 3,679,639 | 7/1972 | Bargain et al. | 260/78 |

*Primary Examiner*—Lester L. Lee

[57] ABSTRACT

Polyimide polymers having an intrinsic viscosity of at least 0.2 dl/g in m-cresol at 25°C. are prepared by reacting a bismaleimide with a difunctional heterocyclic disecondary amine in a phenolic solvent for a time sufficient to form a polymer containing recurring imide units.

10 Claims, No Drawings

POLYIMIDES FROM BISMALEIMIDES AND HETEROCYCLIC DISECONDARY DIAMINES

BACKGROUND OF THE INVENTION

1. Field of the Invention

The present invention relates to high molecular weight polyimide polymers and to a process for the preparation of polyimide polymers. More particularly, this invention relates to the preparation of polyimide polymers of a bismaleimide and a difunctional heterocyclic disecondary amine.

2. Description of the Prior Art

Polyimide polymers of bismaleimides and diamines are well known in the prior art. U.S. Pat. No. 3,625,912 discloses the preparation of polyimide polymers by reacting a bismaleimide with a diamine, for example, piperazine, in the presence of a polar organic solvent. Illustrative examples of solvents which may be used include dimethylformamide, dimethylacetamide, N-methyl pyrrolidinone, butyrolactone and cyclohexanone. The preparation of polyimide polymers by reacting a bismaleimide with a difunctional heterocyclic disecondary amine in the presence of these solvents results in the formation of polyimide polymers of relatively low molecular weight. These low molecular weight polyimide polymers have low tensile strength and are unsatisfactory for the preparation of films; in fact, films prepared from solutions of these low molecular weight polyimide polymers are brittle and non-self-supporting. Accordingly, a need exists in the art for a process for the preparation of polyimide polymers of bismaleimides and difunctional heterocyclic disecondary amines which are of sufficiently high molecular weight and tensile strength to be suitable for the preparation of non-brittle, self-supporting, tough, strong, flexible films.

Additional art relating to imide polymers are U.S. Pat. Nos. 3,634,304 and 3,625,912; German Offenlegenschrift Nos. 1,954,878; 2,057,792; 2,113,063; 2,114,076; and 2,116,199; Japanese Pat. Nos. 37,732(1971); 37,730(1971); 37,734(1971); and 37,735(1971); Mustafa et al., Journal of Organic Chemistry 26 787 (1961); and "Polyimidothioethers" by J. V. Crivello, Polymer Preprints 13 No. 2 (1972), presented at New York ACS Meeting, Aug. 1972.

SUMMARY OF THE INVENTION

Applicant has discovered that polyimide polymers of bismaleimides and difunctional heterocyclic disecondary amines, which polymers are of sufficiently high molecular weight and tensile strength as to be suitable for the preparation of non-brittle, self-supporting, tough, strong, flexible films, may be prepared by reacting a bismaleimide with a difunctional heterocyclic disecondary amine in a phenolic solvent for a sufficient time to form recurring imide units in the polymer. Applicant has also discovered a novel class of high molecular weight polyimide polymers having an intrinsic viscosity of at least 0.2 dl/g as measured in m-cresol at 25°C.

DESCRIPTION OF PREFERRED EMBODIMENTS

N,N'-bismaleimides useful in this invention are well known in the prior art and may be conveniently prepared from maleic anhydride and a diamine as described in U.S. Pat. No. 2,444,536. Briefly, this process comprises reacting maleic anhydride with a primary diamine to yield a bis-maleamic acid. The maleamic acid formed is then cyclized with acetic anhydride using fused sodium acetate to yield the desired N,N'-bismaleimide. Bismaleimides prepared by other processes are also useful in this invention.

The N,N'-bismaleimides may be represented by the formula

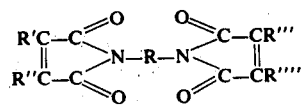

wherein R', R'', R''', and R'''' are independently selected from the group consisting of —H, —F, —Cl, and —Br and wherein R is a divalent organic radical. The diamine employed in this preparation of the bismaleimide determines the divalent R radical connecting the maleimide groups. Since the R radical does not enter into the reaction, it may be any organic radical, including aliphatic or aromatic hydrocarbon radical, such as alkylene, arylene, alkarylene, aralkylene, and substituted derivatives thereof. A preferred class of bismaleimidies of this formula are those where R contains from 1 to 20 carbon atoms. Illustrative examples of R include methylene, ethylene, propylene, butylene, hexamethylene, decamethylene, phenylene, biphenylene, tolylene, ditolylene, xylylene, diphenylmethane, alkyl substituted diphenylmethane groups such as tetramethyldiphenylmethane, diphenylpropane, diethyldiphenylmethane, naphthalene groups and alkyl derivatives thereof,

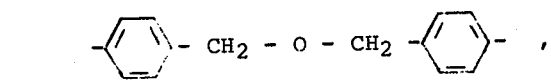

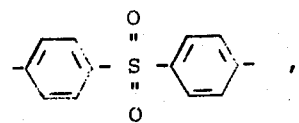

oxydiethylene, oxydiphenylene, chlorohexamethylene, tetrachloroparaphenylene, and cyclohexylene. A particularly preferred class of bismaleimides for the preparation of polyimide polymers having the best thermal stability are those bismaleimides wherein R contains an aromatic group. Additional examples of bismaleimides which may be employed in the process of this invention may be found in U.S. Pat. Nos. 2,818,405; 3,625,912; 2,890,207; 2,971,944; 2,890,206; and 3,334,071, the disclosures of which are incorporated hereinto by reference. Mixtures of bismaleimides may also be used.

The difunctional heterocyclic disecondary amines employed in this invention are also well known in the prior art and include any amine containing at least two secondary amino nitrogens which are a part of a heterocyclic ring. Since only the hydrogen of the secondary amino nitrogens enter into the reaction, the composition of the remaining portion of the amine is not material. A preferred class of difunctional heterocyclic secondary amines may be characterized by the general formula

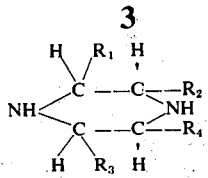

wherein $R_1$, $R_2$, $R_3$, and $R_4$ are independently selected from the group consisting of hydrogen, chlorine, fluorine, bromine, and alkyl groups containing from 1 to 4 carbon atoms. Illustrative examples of amines corresponding to the above formula include piperazine; 2,6-dimethylpiperazine; 2,5-dimethylpiperazine; 2-methyl piperazine; 2,6-dichloropiperazine; 2-methyl-6-chloropiperazine; 2,3,5-trimethyl-6-bromopiperazine; and 2,3,5,6-tetrabutylpiperazine. Mixtures of such amines may also be used. To obtain the highest molecular weight polymers it is preferred to keep the degree of substitution on the diamine low.

The proportion of bismaleimides and difunctional heterocyclic disecondary amines used may be varied over a wide range; for example, the molar ratio of difunctional heterocyclic disecondary amine to a bismaleimide may vary from 5 to 0.1, and preferably from 2 to 0.5. A particularly preferred process employs substantially equal molar amounts of difunctional heterocyclic disecondary amine and bismaleimide.

The phenolic solvents which may be used include any solvent which may be characterized by the formula

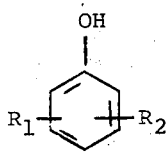

wherein $R_1$ and $R_2$ are independently selected from the group consisting of —H, alkyl group having from 1 to 4 carbon atoms, and halogen, particularly bromine and chlorine. Mixtures of compounds having this formula may also be used. Illustrative examples of such solvents include phenol, o-cresol, m-cresol, p-cresol, xylenols, chlorophenols, 2-bromo-4-methyl phenol and the like. Preferred solvents are phenol, o-cresol, m-cresol, p-cresol, mixtures of these cresols, 2,6-xylenol, p-chlorophenol, and p-ethylphenol.

The process is carried out by dissolving the difunctional heterocyclic disecondary amine and the bismaleimide in the phenolic solvent and stirring the solution for a sufficient period of time to form polyimide polymers containing recurring imide units. The reaction is exothermic so the addition of heat is not necessary. The reaction may be carried out at temperatures above the melting point of the solvent, and preferably from about 20°C. to about 120°C. A particularly preferred temperature is from about 25°C. to about 40°C. The polymerization may be conducted in the presence or absence of air and it is preferred to polymerize under a nitrogen atmosphere.

The concentration of the reactants in the phenolic solvent may vary from about 1% to about 40%, and preferably from 10 to 30%, and more preferably from 10 to 25%, based on the total weight of solution. Generally, the greater the monomer concentration prior to polymerization, the higher the molecular weight or intrinsic viscosity of the polymer and thus the higher the molecular weight of the resulting polyimide. However, if insufficient solvent is used, the polymerization mixture tends to get too viscous to stir. Occasionally, gellation of the polymer may occur in the reaction medium, in which case a lower monomer concentration is used. A particularly preferred monomer concentration is from about 10 to about 25% by weight, based on the total weight of solution.

The polyimide polymer may be precipitated from the reaction product to form a polyimide molding powder by mixing the reaction product with a precipitating agent. The precipitating agents used have a boiling point below 150°C., are miscible with the solvent used to prepare the polyimide polymer, and are a non-solvent for the polyimide polymer. Illustrative examples of suitable precipitating agents include: alkyl alcohols containing from one to six carbon atoms; alkyl ketones containing from three to six carbon atoms; aromatic hydrocarbons, for example, benzene, toluene, xylene, ethyl benzene, and cumene; saturated cycloaliphatic hydrocarbons; saturated aliphatic hydrocarbons; halogenated aliphatic hydrocarbons and halogenated aromatic hydrocarbons, for example, methylene chloride, chloroform, carbon tetrachloride, chlorobenzene, and hexachlorobutadiene; pyridine; cyclic ethers having 4–6 membered rings, for example, dioxane, trioxane, and tetrahydrofuran; and aliphatic carboxylic acids. Preferred precipitating agents are methanol and acetone. The amount of precipitating agent used is that amount necessary to precipitate the polyimide polymer. Frequently, the amount of precipitating agent used is about 1 part to about 10 parts, and preferably from 2 to 5 parts, of precipitating agent per part of solvent used to prepare the polymer. The precipitated polyimide polymer may be isolated from the liquid medium by any suitable means, for example, filtration, decantation, or centrifugation. The isolated polyimide polymer is dried to yield a molding powder.

The polyimide molding powders of this invention find widespread use in applications wherever high temperature resistant polymers are required. They have high tensile and modular strength and excellent thermal properties, such as heat stability. These materials are easily molded into shaped objects which are useful per se, or which can be machined into other useful objects. Examples of these molded objects would include bearings, grinding wheels, washers, piston rings, and other such molded parts where high thermal stability in resistance to chemical corrosion has led to wide acceptance in the automotive and aerospace industries, as well as in other industrial applications.

Polyimide polymer films may be cast directly from the polymer solutions and dried under reduced pressure. The polyimide films may be further cured at elevated temperatures to further improve their physical, chemical and thermal properties. Heat treated polyimide polymers are found to be insoluble in cresol, whereas untreated polyimide polymers are soluble. In addition to high softening point, the polymer films have exceptionally high strength, impact resistance and superior toughness. DTA traces show no sifnificant enthalpic effects between room temperature and 480°C. the cured films are useful at elevated temperatures and are insoluble in cresol, dimethylacetamide, N-methylpyrrolidone, and methyl ethyl ketone. The properties of the polyimide polymers of the present invention make them ideal for use at high temperatures where low-cost polymer is particularly desirable. The reaction is also rapid and results in no by-product elimination of water or carbon dioxide which is prevalent in the synthesis of polyimide polymers using processes proposed prior to this invention.

The polyimide polymers of this invention have very high molecular weight as indicated by the fact that the polyimide polymers have an intrinsic viscosity of at least about 0.20, and preferably of at least about 0.25 to about 1.0 deciliter per gram (dl/g). A preferred class of these high molecular weight polyimide polymers may be characterized by the formula

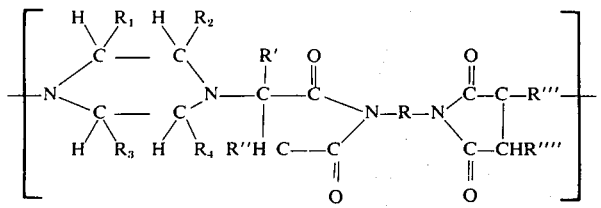

wherein $R'$, $R''$, $R'''$, and $R''''$ are independently selected from the group consisting of —H, —F, —Cl, and —Br; R is a divalent organic radical; $R_1$, $R_2$, $R_3$, and $R_4$ are independently selected from the group consisting of hydrogen, chlorine, fluorine, bromine, and alkyl groups containing from 1 to 4 carbon atoms; and $n$ is an integer. R, $R_1$, $R_2$, $R_3$, $R_4$, $R'$, $R''$, and $R'''$, and $R''''$ have the significance given above. The value of $n$ is at least sufficient to yield a polyimide polymer having an intrinsic viscoisty of at least 0.20 dl/g in m-cresol at 25°C.

The following examples are set forth in illustration of this invention and are not to be construed as limitations thereof. Unless otherwise indicated, all parts and percentages are by weight.

EXAMPLE 1

17.9136 grams (0.05 mol) of methylene bis(4-maleimido benzene) were dissolved into 120 ml of cresol, N.F. in a flask. The solution was flushed with $N_2$ gas for 30 minutes. 4.3000 grams (0.05 mol) of piperazine were then added to the cresol solution of the bismaleimide at room temperature and stirred. The polymerization reaction was allowed to continue while maintaining a temperature of 25°–40°C. until a maximum viscosity was reached, approximately in 2hours. Powered polyimide was obtained by precipitating part of the resin solution with stirring into acetone, followed by filtering, washing with acetone, and drying. The dried polyimide was an off-white powder and had a reduced viscosity number of 0.48 dl/g at 25.5°C. as determined by dissolving 0.5000 gram of the product in 100 ml of cresol, N.F. TGA spectra indicated that the polyimide did not degrade below 225°C. and DTA showed no enthalpic changes up to 480°C. as determined on a DuPont Differential Thermal Alalyzer, Model 900 at a heating rate of 10°C. per minute.

Films were cast from the other part of the resin solution, air dried, and then further dried at 80°C. under reduced pressure. The film was then heated to 100°C. for 24 hours. The physical properties of the film at room temperature were:

| | |
|---|---|
| Tensile Strength (T) | 10,300 psi |
| Tensile Modulus (Mi) | 310,000 psi |
| Elongation (E) | 8% |

The film was then heated at 150°C. for 1 hour with the resulting physical properties: $T/M_i/E$ of 10,500/280,000/8. When the film was further heated to 180°C. for 1 hour, the resulting physical properties were determined to be: $T/M_i/E$ of 11,600/310,000/9. Heat treated films were found to be insoluble in cresol, whereas the untreated films were soluble.

EXAMPLe 2

17.9 grams of methylene bis(4-maleimido benzene) are dissolved in 120 ml of m-cresol and placed in a reaction flask. The flask is then flushed with nitrogen gas for 30 minutes. 4.3 grams of piperazine are then added to the m-cresol solution of the bismaleimide at room temperature and stirred. The polymerization reaction is allowed to continue while maintaining a temperature of 25° to 40°C. until a maximum viscosity is reached, approximately 2 hours. One-half the resulting solution of polyimide is then poured with stirring into acetone to precipitate the polyimide polymer. The polyimide polymer is removed by filtration, washed with acetone, and dried. The dried polyimide is an off-white powder and has an intrinsic viscosity of 0.3 dl/g as measured in m-cresol at 25.5°C.

The remaining polyimide solution is used to cast films. The films are air-dried and then further dried at 80°C. under reduced pressure. The dried films are then heated for 24 hours at 100°C. The cured film had a tensile strength of 10,300 psi, tensile modulus of 310,000 psi and an elongation of 8%. The film is then heated at 150°C. for 1 hour and was found to have a tensile strength of 10,500 psi, a tensile modulus of 280,000 psi and an elongation of 8%. The film is then further heated to 180°C. for 1 hour to yield a film having a tensile strength of 11,600 psi, a tensile modulus of 310,000 psi and an elongation of 9%.

EXAMPLE 3

4.3 grams of piperazine are added with stirring to a solution of 18 grams of N,N'-4,4'-diphenyl ether bismaleimide in 120 ml cresol N.F. under nitrogen atmosphere. The polymerization is allowed to continue for 2 hours while maintaining a temperature of 25° to 40°C. Powdered polyimide is obtained by precipitating part of the resin solution with acetone and air drying. The dried polyimide powder had an intrinsic viscosity of 0.25 dl/g at 25.5°C. in m-cresol. The polyimide powder did not degrade at temperatures below 250°C. and DTA traces show no significant enthalpic effects between room temperature and 480°C.

Films cast from the remaining portion of the polyimide cresol N.F. solution are dried under reduced pressure and then heated to 100°C. for 24 hours to yield a film having a tensile strength of 10,700 psi, a tensile modulus of 350,000 psi and an elongation of 4.7%. The film is then further heated at 150°C. for 1 hour to yield a film having a tensile strength of 11,100 psi, a tensile modulus of 330,000 psi and an elongation of 4.6%. When this film is further heated to 180°C. for 1 hour, the resulting film had a tensile strength of 13,500 psi, a tensile modulus of 405,000 psi and an elongation of 6%. The heat treated films are insoluble in cresol N.F.

EXAMPLE 4

5.4 grams of piperazine are added to a stirred solution of 16.8 grams of N,N'-m-phenylene bismaleimide in 120 ml of cresol N.F. under nitrogen atmosphere. The polymerization is allowed to continue for 2 hours while maintaining a temperature of 25° to 40°C. until a maximum viscosity is reached. Powdered polyimide is obtained by precipitating part of the resin solution by pouring the solution with stirring into acetone. The precipitated polyimide is removed by filtering and air-drying. The dried polyimide powder has a reduced viscosity of 0.32 dl/g at 25.5°C. as measured in 0.5% cresol N.F. solution.

ture for 2 hours to allow the polymerization reaction to continue to form a polyimide polymer, having an intrinsic viscosity of 0.345 dl/g in cresol N.F. at 25.5°C.

The polyimides of examples 9–11 are prepared by adding an equivalent amount of piperazine to stirred solution of N,N'-4,4'-diphenyl ether bismalimide. The solvent and monomer concentration used are shown in Table I. The polymerization is allowed to continue for 2 hours at 75°C. The reaction mixture is poured into acetone to precipitate the polymide polymer. The polymer is isolated, washed with acetone and dried. The intrinsic viscosity of the polyimide polymer is measured in m-cresol. Films are cast from cresol solutions and air dried. The films are cured by heating at 100°C. for 24 hours, at 150°C. for 1 hour, and at 180°C. for 1 hour. Physical properties of the films are shown in Table I.

TABLE I

| Example Number | Solvent | Monomer Concentration % | Intrinsic Viscosity dl/g | Tensile Strength psi | Modulus-psi | Elongation % |
|---|---|---|---|---|---|---|
| 9 | p-ethyl phenol | 25 | 0.24 | 11,900 | $0.44 \times 10^6$ | 3.7 |
| 10 | 2,6-xylenol | 15.5 | 0.29 | 8,400 | $0.34 \times 10^6$ | 3.75 |
| 11 | phenol | 25 | 0.29 | 2,400 | $0.4 \times 10^6$ | 4.87 |

EXAMPLE 5

4.3 grams of piperazine are added to a stirred solution of 20.4 grams of N,N'-4,4'-diphenyl sulfone bismaleimide in 120 ml of cresol, N.F. under nitrogen atmosphere. The polymerization is allowed to continue for 2 hours while maintaining a temperature of 25°–40°C. until a maximum viscosity is reached. Powdered polyimide is obtained by precipitating part of the resin solution into stirring acetone. The powder polyimide has a reduced viscosity number of 0.21 dl/g at 25.5°C. measured at 0.5% in cresol N.F. TGA spectra indicated that the polyimide does not degrade below 225°C. and DTA shows no enthalpic changes up to 480°C. Films may be cast directly from resin solution.

EXAMPLE 6

5.7 grams of 2,6-dimethyl piperazine are added with stirring to a solution of 18 grams of N,N'-4,4'-diphenyl ether bismaleimide in 120 ml of cresol N.F. under nitrogen atmosphere. The polymerization is continued for 2 hours, at ambient temperature to yield a viscous solution of polyimide dissolved in cresol N.F. Films may be cast directly from the polyimide solution or powdered polyimide may be obtained by precipitating the resin solution into acetone.

EXAMPLE 7

Equivalent amounts of piperazine and N,N'-4,4'-diphenyl ether bismaleimide are dissolved in cresol N.F. to give a monomer concentration of 8.5%. The resulting solution is maintained at ambient temperature for two hours to allow the polymerization reaction to continue to form a polyimide polymer, having an intrinsic viscosity of 0.21 dl/g in cresol N.F. at 25.5°C.

EXAMPLE 8

Equivalent amounts of piperazine and N,N'-4,4'-diphenylether bismaleimide are dissolved in cresol N.F. to give a monomer concentration of 15%. The resulting solution is maintained at ambient tempera-

EXAMPLE 12

Polyimide polymer powder is prepared with piperazine and methylene bis (4-maleimido benzene) in cresol, N.F., according to the procedure of Example 1. The powder was molded into a disc at the molding conditions of 250°C. and 8,000 psi. The disc has a Barcol hardness of 52. After being heated at 180°C. for 60 days, the disc has a Barcol hardness of about 60. It is apparent therefore that the cured polyimide polymer is stable at elevated temperatures.

EXAMPLE 13

In Examples 13–18, polyimide polymers are obtained by polymerizing equivalent amounts of methylene bis(4-maleimido benzene) and piperazine in m-cresol solvent at different monomer concentrations and temperatures. The monomer concentration, temperature, and intrinsic viscosity of the produced polyimide polymer in m-cresol are shown in Table II.

TABLE II

| Example Number | Monomer Concentration % | Temperature °C. | Intrinsic Viscosity dl/g |
|---|---|---|---|
| 13 | 15.6 | 25 | 0.30 |
| 14 | 20.0 | 25 | 0.39 |
| 15 | 25.0 | 25 | 0.43 |
| 16 | 30.0 | 25 | 0.53 |
| 17 | 15.6 | 10 | 0.27 |
| 18 | 15.6 | 40 | 0.26 |

The results indicate that the intrinsic viscosity of the polyimide polymer increases with increasing monomer concentration, whereas the polymerization temperature does not appear to have any effect on the intrinsic viscosity of the polyimide polymer.

Attempts to carry out the reaction of bismaleimide with difunctional heterocyclic disecondary amines using dimethyl acetamide, dimethyl formamide, or N- methyl pyrrolidinone as the solvent instead of cresol, resulted in the formation of gelled products or in low molecular weight products which yielded very brittle films and films which were not self-supporting.

Although this invention has been described with reference to specific bismaleimides, difunctional hetercyclic disecondary amines, phenolic solvents, and process conditions, it will be appreciated that other process conditions including monomer concentrations, temperature and reaction time and other disecondary amines, bismaleimides and phenolic solvents may be employed in place of those specifically described above without departing from the spirit and scope of the present invention.

What is claimed and desired to be secured by Letters Patent is:

1. In a process for the preparation of a polyimide polymer by reacting a bismaleimide with a difunctional heterocyclic disecondary amine characterized by the formula

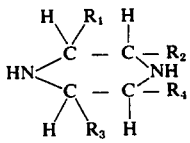

wherein $R_1$, $R_2$, $R_3$, and $R_4$ are independently selected from the group consisting of hydrogen, halogen and alkyl groups containing from 1 to 4 carbon atoms, in the presence of a solvent for a sufficient time to form a polymer having recurring imide units in the polymer, wherein the reaction is carried out at a temperature from about 20°C. to about 120°C. and wherein the total concentration of bismaleimide and difunctional heterocyclic disecondary amine in the solvent is from about 1% to about 40% by weight and wherein the molar ratio of difunctional heterocyclic disecondary amine to bismaleimide is from 5 to 0.1, the improvement which comprises carrying out the polymerization reaction in the presence of at least one solvent characterized by the formula

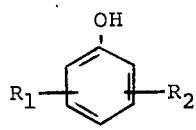

wherein $R_1$ and $R_2$ are independently —H, halogen, or alkyl containing from 1 to 4 carbon atoms.

2. A process of claim 1 wherein the solvent is phenol, o-cresol, m-cresol, p-cresol, 2,6-xylenol, mixtures of o-cresol, p-cresol, and m-cresol, p-chlorophenol, and p-ethylphenol.

3. A process of claim 2 wherein the bismaleimide is characterized by the formula

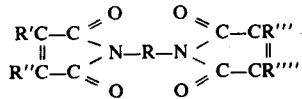

wherein R is a divalent organic radical and R', R'', R''', and R'''' are independently selected from the group consisting of —H, —F, —Cl, and —Br.

4. A process of claim 2 wherein the difunctional heterocyclic disecondary amine is piperazine.

5. A process of claim 2 wherein the bismaleimide is selected from the group consisting of methylene bis(4-maleimido benzene), N,N'-4,4'-diphenyl ether bismaleimide, N,N'-4,4'-diphenyl sulphone bismaleimide, and phenylene bismaleimide.

6. A process of claim 5 wherein the difunctional heterocyclic disecondary amine is piperazine, the temperature is from 20° to 120 °C., and the total concentration of the bismaleimide and piperazine is from 10 to 30% by weight, based on the total weight of solution.

7. A process of claim 1 wherein the polyimide polymer is precipitated from solution by mixing the polyimide solution with a precipitating agent characterized by having a boiling point below about 150°C., by being miscible with the solvent used to prepare the polyimide polymer, and by being a non-solvent for the polyimide polymer, and wherein the precipitated polyimide polymer is separated from the liquid phase.

8. A polyimide powder prepared by drying a polyimide polymer obtained by the process of claim 7.

9. A process of claim 2 wherein the total concentration of bismaleimide and difunctional heterocyclic disecondary amine in the solvent is from 10 to 30% by weight.

10. A polyimide polymer of a bismaleimide and a difunctional heterocyclic disecondary amine characterized by the formula

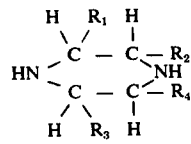

wherein $R_1$, $R_2$, $R_3$, and $R_4$ are independently selected from the group consisting of hydrogen, halogen, and alkyl groups containing from 1 to 4 carbon atoms, wherein the polymer is soluble in cresol at 25°C. and has an intrinsic viscosity of at least 0.20 dl/g. in m-cresol at 25°C.

* * * * *